M. VAN OMME.
CORN PICKING AND HUSKING MACHINE.
APPLICATION FILED OCT. 16, 1917.

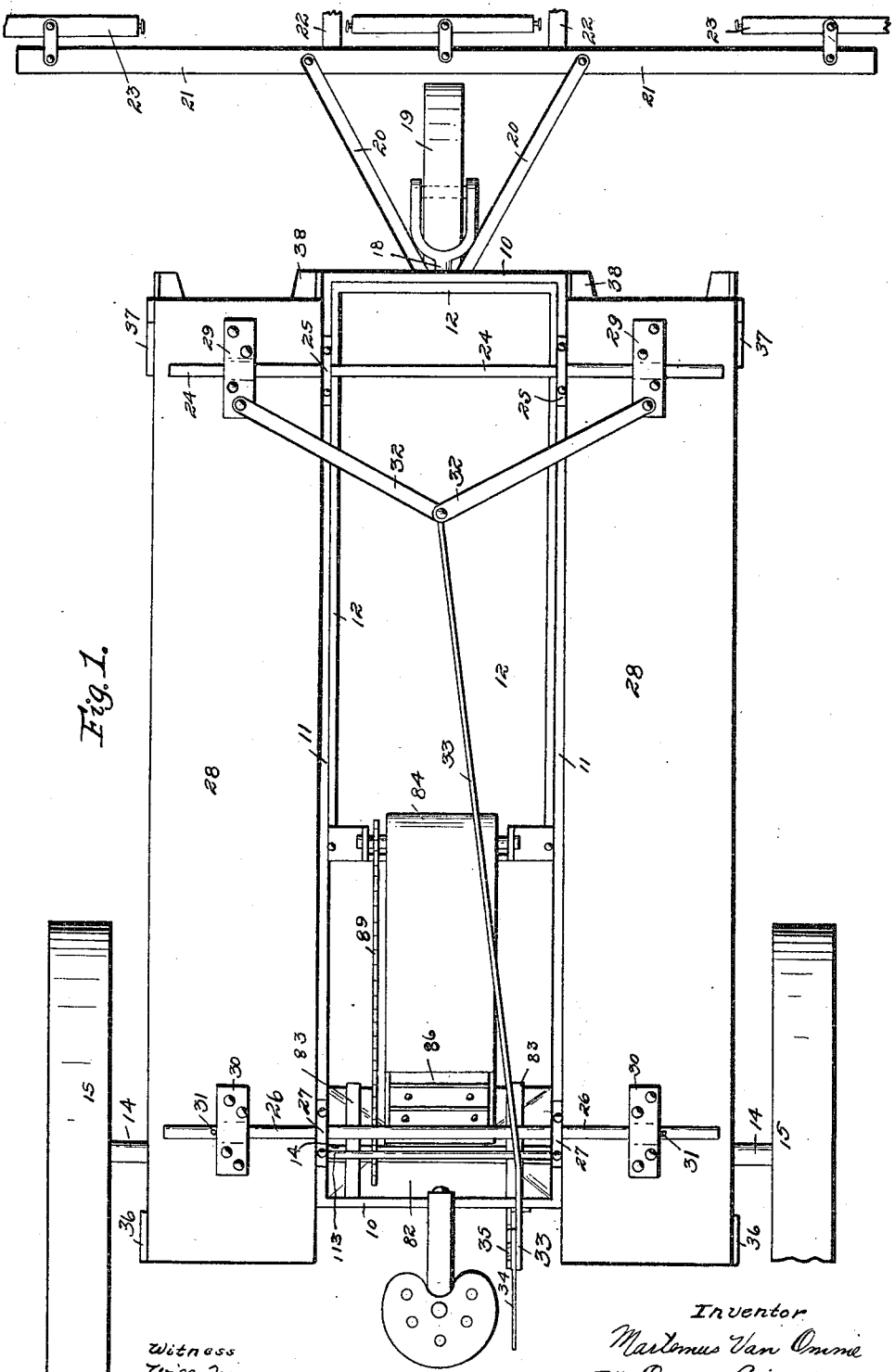

1,272,733.

Patented July 16, 1918.
7 SHEETS—SHEET 2.

Witness
Will Freeman

Inventor
Martemus Van Omme
BY Orwig & Bair
Att'ys

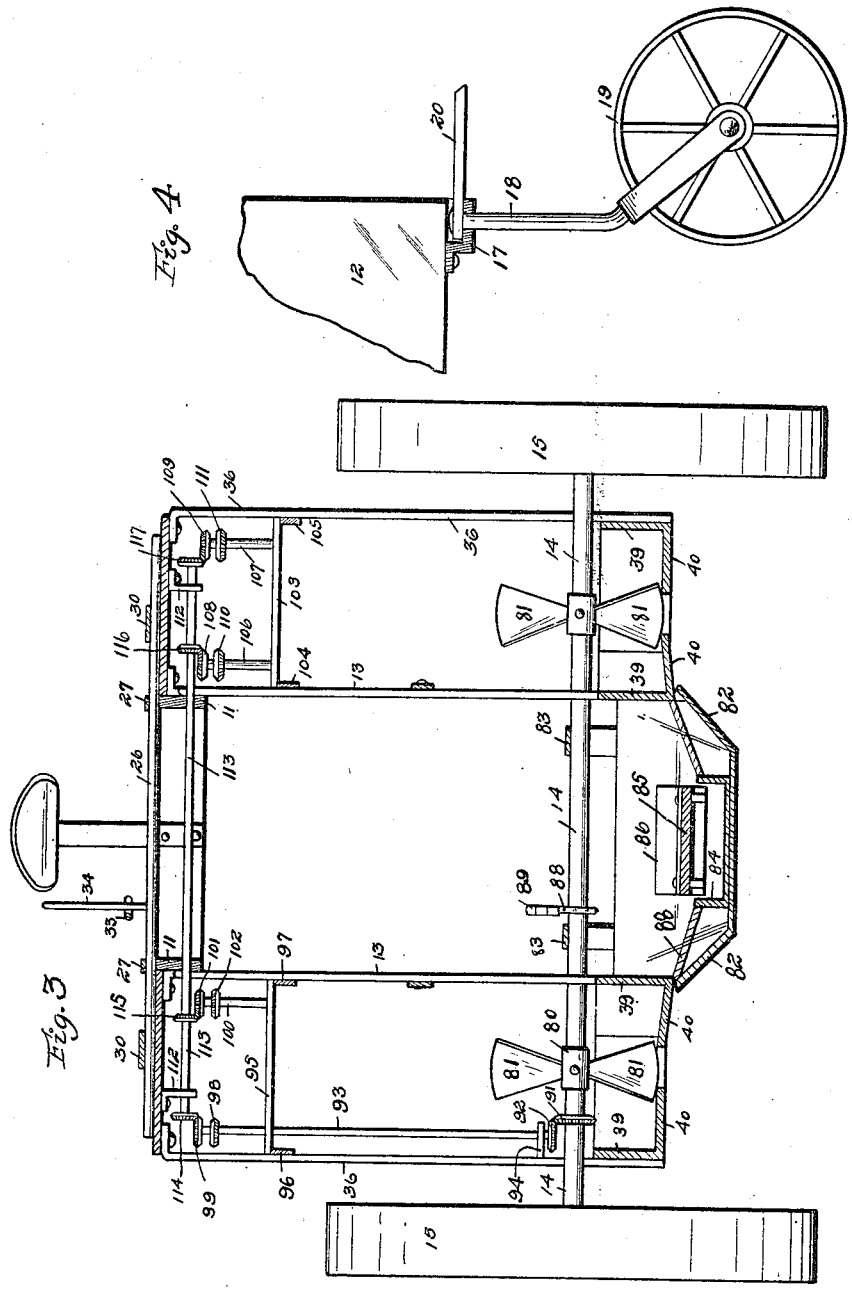

M. VAN OMME.
CORN PICKING AND HUSKING MACHINE.
APPLICATION FILED OCT. 16, 1917.
1,272,733.
Patented July 16, 1918.
7 SHEETS—SHEET 4.
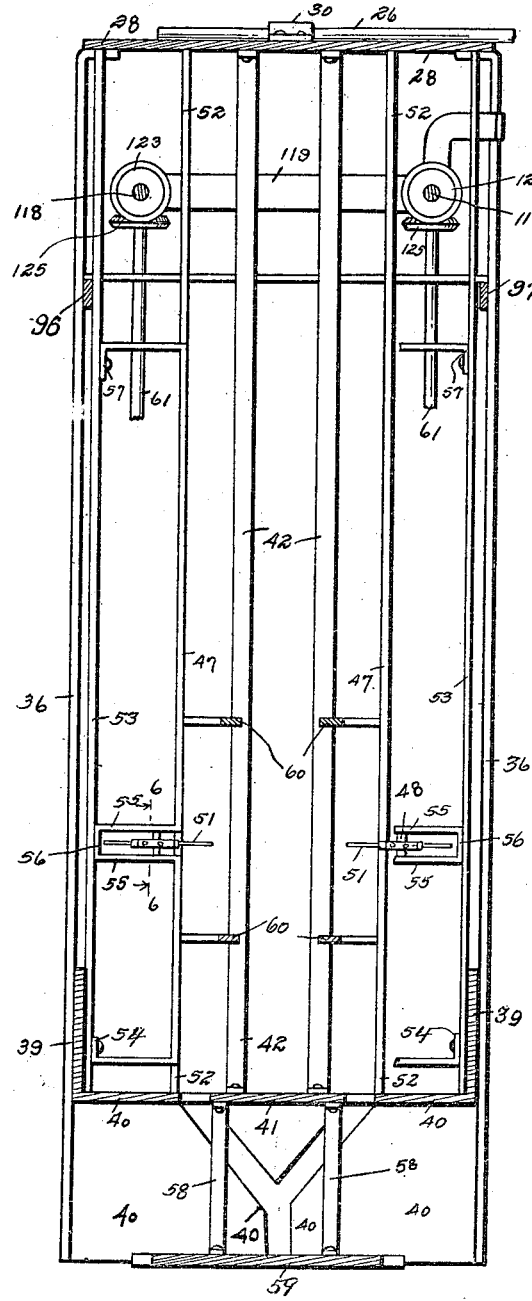
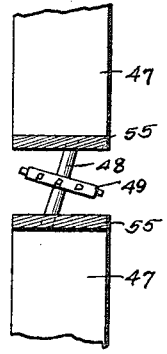

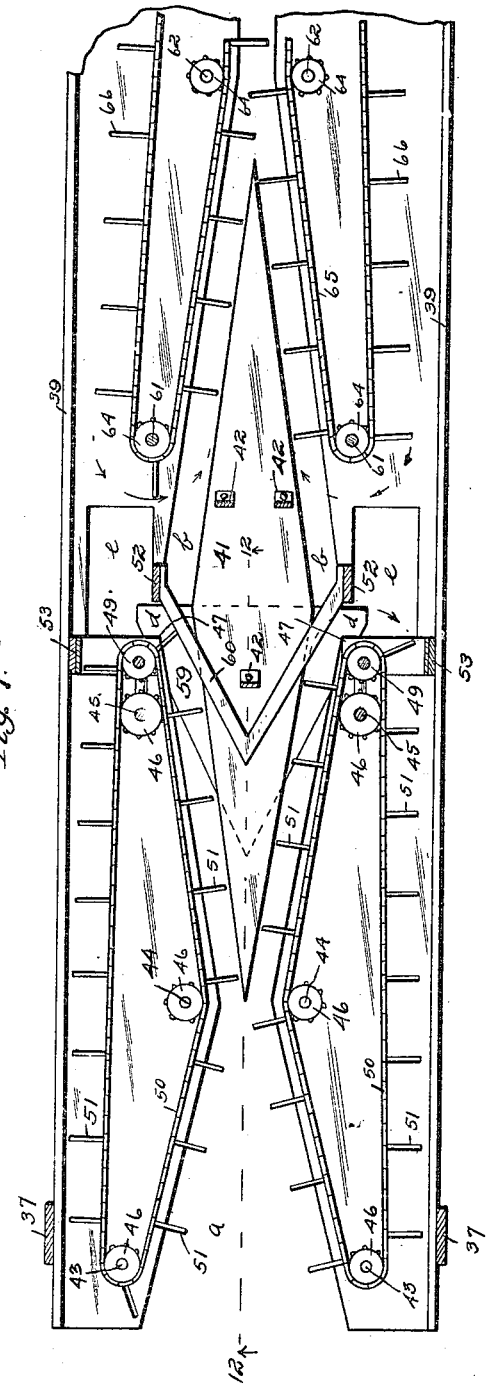

M. VAN OMME.
CORN PICKING AND HUSKING MACHINE.
APPLICATION FILED OCT. 16, 1917.
1,272,733.
Patented July 16, 1918.
7 SHEETS—SHEET 6.
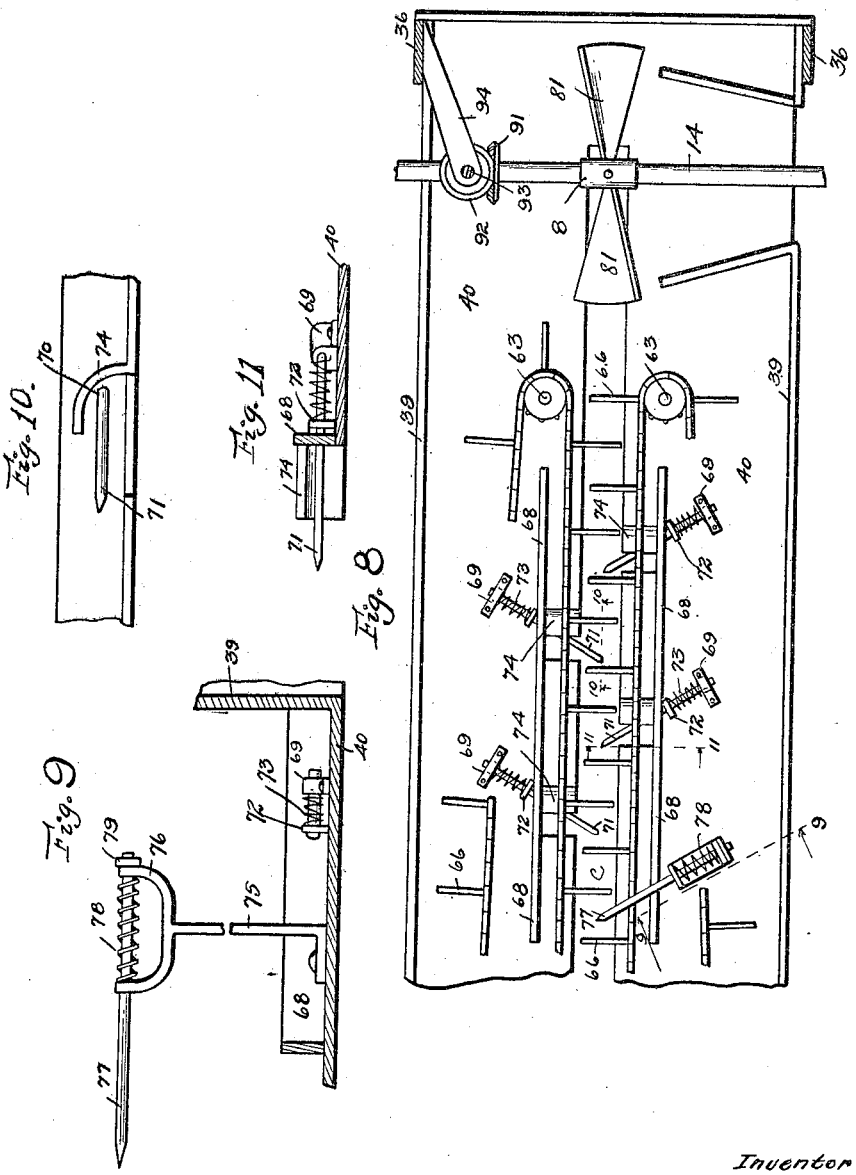

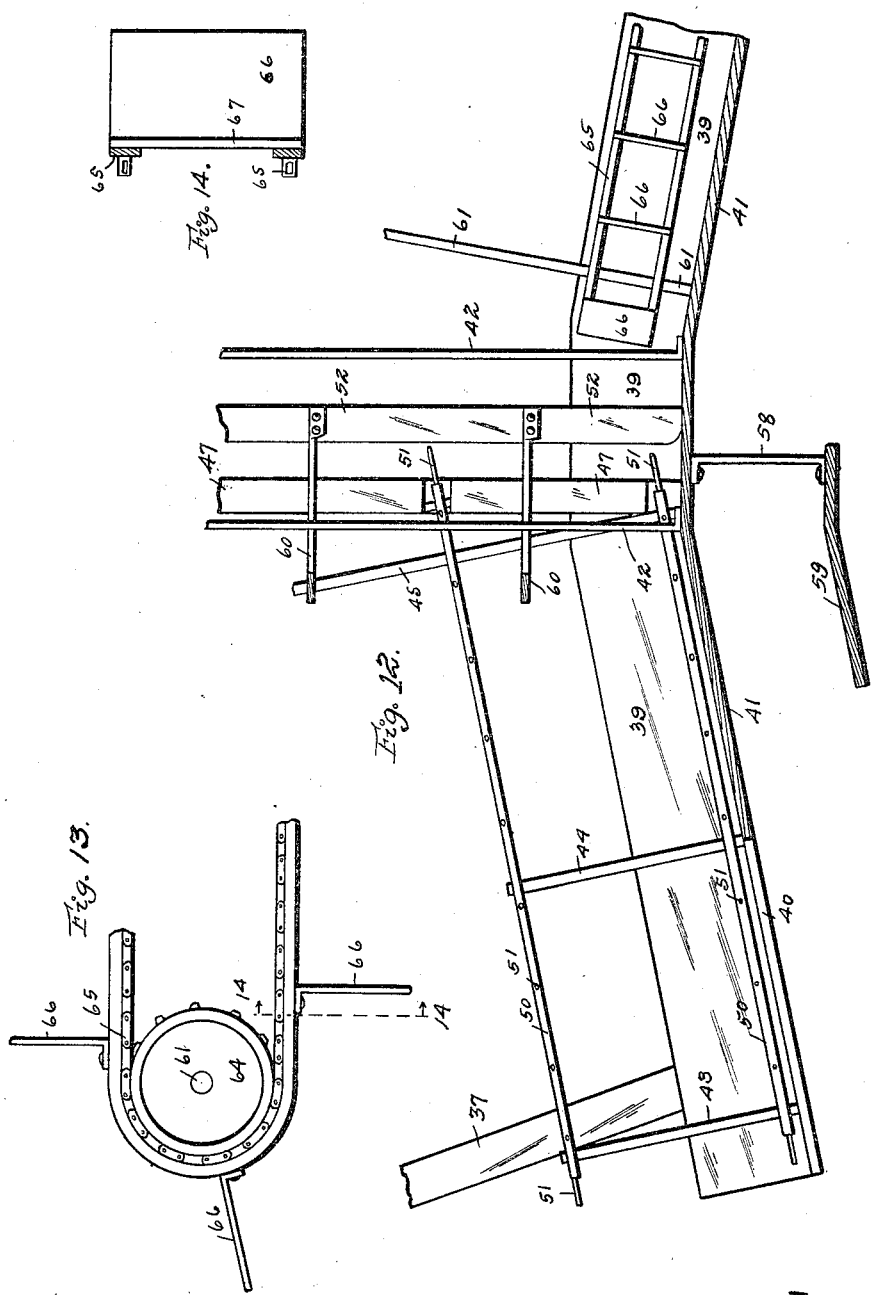

UNITED STATES PATENT OFFICE.

MARTEMUS VAN OMME, OF DES MOINES, IOWA.

CORN PICKING AND HUSKING MACHINE.

1,272,733.  Specification of Letters Patent.  Patented July 16, 1918.

Application filed October 16, 1917. Serial No. 196,951.

*To all whom it may concern:*

Be it known that I, MARTEMUS VAN OMME, a subject of the Queen of the Netherlands, and resident of Des Moines, in the county of Polk and State of Iowa, have invented a certain new and useful Corn Picking and Husking Machine, of which the following is a specification.

The object of my invention is to provide a corn picking and husking machine of simple, durable and inexpensive construction.

A further object of my invention is to provide a corn picking machine based upon the principle that the rooting of the corn stalks in the ground furnishes a sufficient grip upon the stalk to permit the ear to be held in any desired place by the pulling of the stalk against the ear when the latter is placed in a receptacle having a slot in its bottom of sufficient width to permit the stem to extend therethrough but narrow enough to prevent the ear from passing therethrough. In order to take advantage of this principle I have provided means for retaining the ear from being pulled out of the machine while the different operations of husking and picking are taking place but at the same time cause the forward movement of the machine to coöperate with the stationary position of the root of the stalk to aid in pulling the ear to the various positions in the machine where it is operated on whereby considerable amount of gripping and carrying machinery may be eliminated.

A further object of my invention is to provide a corn picking machine adapted to be driven along the rows of corn and to separate the ears from the stalk after the ears have been husked, so that it is possible to convey the ears, which have been operated on to a retaining box whereby the machine may be used to accomplish all the purposes, which have largely heretofore been accomplished by hand picking and husking.

A further object of my invention is to provide a machine provided with a box, an elevator to convey the picked ears thereto and one or more sets of the picking and husking mechanism, which are so placed that they may be carried forward along the rows of corn and accomplish their functions without attention from the driver other than to see that the husking and picking mechanism is not diverted too far from alinement with the rows of corn.

A further object of my invention is to provide means for adjusting the space between the various sets of husking and picking mechanisms, so that the machine will accommodate itself to rows of corn, which are of varying distances apart.

A further object of my invention is to provide means for operating the mechanism of my improved machine from a single power shaft or source of power, so that if the machine is properly designed when manufactured all the parts will work in harmony together thereby eliminating the necessity for adjustment of the various parts to correspond with the conditions, which may be encountered.

It should be explained that my invention was conceived after attempting to pull back a stalk of corn, which had grown through between two slats of a fence and the ear had matured on the stalk on the side of the fence opposite that where I stood. The stalk pulled through between the slats very easily until the ear reached the slats when it acted as a stop, so that the stalk could be pulled no farther but the ear would readily slide up and down the slats.

My invention consists in providing mechanism based upon the principle thus disclosed, so that the ears may be separated from the stalk by forcing the stalk between two parallel slats, which are spaced a sufficient distance apart to permit the stalk to pass therebetween but to prevent the ear from passing therebetween. It will be seen from the foregoing that if the processes described have been accomplished the ear may be pulled along between the two parallel slats by a pull on the stalk and the operation of husking the ear may be performed by suitable mechanism.

Having this principle of operation in mind a further object of my invention is to provide means whereby the growing stalks of corn may be brought to position where they may be forced through between two vertical parallel slats whereby the stalk will stand at one side of the slats while the ear will be on the other side of the slats.

My object is then to provide a downwardly inclined continuation of the slot formed between the spaced parallel vertical slots along which the ear may be pulled to pass husking pins to position where means may be provided to knock it loose from its stem and into a suitable container.

A further object of my invention is to provide a plate having a longitudinal slot therein, which is designed to be secured to the side of my supporting frame, so that the forward movement of the supporting frame will cause the standing stalks of corn to move along the slot formed in said plate until they come to position where the stalk may be forced through the spaced vertical slats.

A further object of my invention is to provide endless chain devices adjacent to said slot, which have fingers or followers thereon adapted to insure that the stalks will move rearwardly through said slot.

A further object of my invention is to form said slot with an enlargement intermediate of its ends and to provide a dividing plate with its forward end pointed so that where there is more than one stalk of grain in a hill one or more of the stalks will pass to either side of the slot and to provide a pair of vertical spaced slats at either side of this enlargement, so that the ears on at least two of the stalks in each hill may be removed therefrom and husked.

A further object of my invention is to provide a continuation of the slot in said plates toward its rearward end along which the ears after they have been separated from the stalks, but are still attached thereto by their stems may be moved past husking pins whereby the husks may be torn from the ears.

A further object of my invention is to provide endless chain devices having fingers or followers secured thereto, which form cribs wherein the ears are received through their rearward movement, so that the husking pins may act effectually upon the husks.

A further object of my invention is to provide husking pins arranged to extend into the path of travel of the ears, so that the contact of the ear with the point of the pin will break the husks and to provide yielding mountings for the pins, so that further forward movement of the ears tends to force the pins out of the path of travel of the ears whereby the points of the pins will tear the husks away from said ears.

A further object of my invention is to provide a rotary fan adapted to contact with the ears after they have been husked to break the stems and at the same time knock the ears over into a pan or container from which they may be conveyed by an elevator into any suitable box.

With these and other objects in view, my invention consists in the construction, arrangement and combination of the various parts of my device whereby the objects contemplated are attained, as hereinafter more fully set forth, pointed out in my claims, and illustrated in the accompanying drawings, in which:

Figure 1 shows a top or plan view of a machine embodying my invention.

Fig. 2 shows a side elevation thereof.

Fig. 3 shows a vertical, sectional view taken on the line 3—3 of Fig. 2.

Fig. 4 shows a side elevation partly in section of the means for connecting the forward supporting wheel with the pulling force.

Fig. 5 shows a vertical, sectional view taken on the line 5—5 of Fig. 2.

Fig. 6 shows an enlarged detail view taken on the line 6—6 of Fig. 5.

Fig. 7 shows a top or plan view on an enlarged scale of the mechanism whereby the ears of corn are separated from the stalks and started toward the husking devices.

Fig. 8 shows a top or plan view of the husking mechanism and the means for breaking the stem from the stalk.

Fig. 9 shows a vertical, sectional view taken on the line 9—9 of Fig. 8.

Fig. 10 shows a similar view taken on the line 10—10 of Fig. 8.

Fig. 11 shows a similar view taken on the line 11—11 of Fig. 8.

Fig. 12 is a vertical, sectional view taken on the line 12—12 of Fig. 7.

Fig. 13 shows an enlarged top or plan view of the portion of the endless chain and conveyers which move the ears rearwardly during the husking process, and Fig. 14 shows a vertical, sectional view taken on the line 14—14 of Fig. 13.

Referring to the accompanying drawings I have used the reference numeral 10 to indicate generally the end members of the main frame having side members 11. The frame has suspended from its forward end a wagon box 12 adapted to receive the ears of corn after they have been husked and broken away from the stalk. Brace members 13 extend down from each of the members 11 to the rear axle 14 and form a bearing therefor whereby the main frame is supported by said axle. Traction wheels 15 are mounted at the ends of the axle 14 and fixed thereto, the traction wheels being spaced a proper distance apart, so that they may travel in the spaces between rows of corn, which are spaced apart by a third similar space. Downwardly extending brace members 16 are secured to the frame members 11 at their forward ends and are connected by a cross piece 17, which is also secured to the lower forward end of the wagon box 12. An opening is provided in the center of the cross piece 17 in which the stem 18 of the supporting wheel 19 is journaled. A pair of forwardly extending bars 20 are fixed to the upper end of the stem 18 and support at their forward ends a draft beam 21. A pair of thills 22 are secured to the draft beam 21 intermediate of its ends. A swingletree 23 is secured to each of the ends of the draft beam 21 and between the thills 22.

It will be seen from the foregoing that I have provided a framework, supporting wheels and draft attachments adapted to drive between four adjacent rows of corn having the two rear wheels and two outer horses between the pairs of outer rows of corn while the central horse and forward or steering wheel move between the two central rows of corn.

A bar 24 is secured to the main frame near its forward end by any suitable means as by straps 25. The ends of the bar 24 project laterally from the main frame for some distance for a purpose hereinafter to be described. A similar transverse bar 26 extends across the rear end of the main frame and is secured thereto by straps 27. A pair of plates 28 are supported in a manner hereinafter described by the bars 24 and 26 at either side of the main frame in position above the rows of corn between the wheels 15. The forward ends of the plates 28 have straps 29 secured thereto within which are received the projecting ends of the bar 24. These ends are loosely received within the straps, so that the plates may slide toward and from the main frame while supported by the bar 24. Similar straps 30 are provided at the rear end of the plates 28, which somewhat loosely receive the projecting ends of the bar 26. Pins 31 extend through the bar 26 to prevent the sliding movement of the straps 30 thereon. Arms 32 have one of their ends pivoted to each of the plates 29 and their other ends pivoted together and to control rod 33. The control rod 33 extends rearwardly to a lever 34, which is provided with a notched sector 35 whereby the arms 32 may be held from movement or moved at the will of the operator.

It will be seen from the foregoing that the plates 28 may swing outwardly at their forward end, so that their longitudinal centers may be alined with the rows of corn over which they are passing while the rear ends will remain substantially stationary. The straps 29 and 30 receive the bars 24 and 26 loosely enough to permit the necessary pivotal and sliding movement. Movement of the lever 34 therefore permits the operator to regulate the distance which the forward ends of the plates 28 are spaced apart, so that where rows of corn vary in spacing the adjustment of the machine will nevertheless permit the mechanism therein to successfully operate upon the stalks to remove and husk the ears.

At the rear ends of the plates 28 a pair of downwardly extending supports 36 are secured, and at the forward ends of said plates similar supports 37 extend downwardly. A channel shaped plate 38 is supported by the members 36 and 37 below each plate 28 in position spaced somewhat above the ground level. The channel shaped plates 38 consist of longitudinal side members 39 and a bottom member 40. The forward end of the plates 38 are inclined downwardly and from their central portions and the rearward ends are also inclined downward while the extreme rear ends are substantially horizontal. The central portions of the plates 38 are also horizontal for a short distance and extend about twenty-three inches off the ground as experiments have determined that this is approximately the minimum height of the ears of corn on the stalks. A channel or slot is cut from the bottom 40 of the channel shaped plate, which extends from the front end to a point adjacent to the back end, which is shaped as hereinafter described. The portion of the slot adjacent to the forward end of the plates 38 is comparatively wide at its forward end and its sides converge until they are about four inches apart. The channel then widens out and again contracts whereby a central diamond shaped portion $b$ is formed (Fig. 1). To the rear of the diamond shaped portion $b$ a straight sided channel $c$ is formed, which is approximately an inch and three-quarters wide. The portion $c$ extends to a point near the rear end of the plate 38. A diamond shaped plate 41 is supported by uprights 42 in the center of the diamond shaped portion $b$ of the channel in the plate 38 and is of such size and shape that a passageway about two inches wide remains between the edges of the plate 41 and the edges of the portion $b$.

Drive shafts 43, 44, and 45 have a plurality of sprockets 46 secured thereto in alinement and spaced somewhat above the plate 38. A support 47, the character of which will hereinafter be described carries a stub shaft 48, which in turn carries a spocket 49 in position directly above the rear sprocket on the shaft 45. A plurality of sprockets 46 are supported in alinement in position spaced above a series of sprockets upon the shafts 43, 44, and 45, these sprockets being alined with the sprockets 49. Chains 50 are extended around each of the series of sprockets 46 and in the case of the upper series also extend around the sprockets 49. These chains are provided with followers or pushers 51, which extend outwardly over the portions $a$ and $b$ of the channel in the plate 38, the followers 51 being of such length as to substantially extend across the passageway between the plate 41 and the sides of the portion $b$. At the widest portion of the diamond shaped portion $b$ channel openings $d$ are provided, at the outer end of which comparatively large holes $e$ are formed in the plate 40. The openings $d$ are about an inch and three-quarters wide while the openings $e$ are of such size that a fully developed corn stalk including the leaves may be easily pulled therethrough. At the rear side of the openings $d$ a vertical rod or slat 52 is secured, which extends upwardly to the plates 28. At the forward side of the openings $d$ a slat 47 is extended upwardly.

As provision must, however, be made in this slat to permit the conveyer chains 50 to pass therethrough this slat is formed by securing an upright 53 to the sides 39 of the plate 38 at their bottoms and securing their upper portions to the plates 28. The slat 47 then has its lower end secured at 54 to the upright 53 in position above the lower rear sprockets 46, thence it extends laterally to position alined longitudinally with the slat 52, thence upwardly to position below sprockets 49 where a U-shaped member 55 is formed, which acts as a bearing for the stub shaft 48 and has the central portion of the U-shaped member secured to the upright 53 at 56. From the upper end of the U-shaped portion 55 the slat 47 again extends upwardly to position near the plate 28 where it is again bent laterally and secured to the upright 53 at 57. A pair of members 58 extend downwardly from the plate 41 and support a second plate 59, which is substantially triangular in shape and of such size that one corner will be somewhat to the rear of the forward corner of the plate 41 while the other two corners will extend out to positions below the openings $e$. This plate should be approximately fourteen inches from the ground although its distance from the ground depends largely upon the distance it is spaced outwardly from position directly below the forward sides of the openings $d$.

I shall now proceed to describe the practical operation of the parts, which have so far been mentioned. It may be assumed that the shaft 45 is suitably connected with the rear traction wheels 15, so that the followers 51 on the chains 50 will travel rearwardly at substantially the same speed that the machine is traveling forward. If the machine then be driven over the ground in such direction that a row of corn will extend directly in front of the center of the channel $a$, it will be seen that the upright stalks of corn will pass rearwardly along the channel $a$ due to the forward motion of the machine. When the stalks come to the end of the channel $a$ and the forward end of the plate 41, it will be seen that if there should be more than one stalk in a hill, the stalks will be divided so one will travel along the one side of the plate 41 while the other will travel along the other side of the plate 41.

When the upright stalks reach position between the plate 41 and the side of the portion $b$ the followers 51 will engage the stalks thereby forcing their rearward movement relative to the machine until they reach position adjacent to the slats 47 and 52. When they reach position adjacent to these members, it will be seen that the plate 59 will yieldingly hold the lower portion of the stalk against the edges of the portion $b$, so that when the stalk comes to the portion $d$ the lower portion thereof will be pushed therethrough. The upper portion of the stalk is also guided in that direction by means of angular brackets or guides 60, which extend forwardly from the slats 52 with their points substantially above the longitudinal center of the plate 41.

It will be seen that the action of the guides 60 and the plate 59 will be to throw the stalk up into the opening $d$ when at this time the followers 51 on the conveyers 50 will push the stalk through the space between the slats 47 and 52. These slats are, however, only far enough apart (or the portion $d$ is only wide enough) to permit the stalk to pass through while any ears on the stalk will be thicker than the portion $d$ is wide, so that they will remain on the side of the slats 47 and 52 adjacent to the plate 41. As the stalk is still rooted in the ground and as the machine still continues to move forward there will be a downward and rearward pull on the stalk whereby the ears, which are hanging through the slats 47 and 52 will slide down the slats until they reach position where they are held from further downward movement by the contact with the plate 41. As at this point, however, the slat 52 stops, it will be seen that further forward movement of the machine will permit the ears to slide rearwardly past slat 52 and along the rear end of the passageway from between the plate 41 and the edges of the portion $b$.

At the rear end of the channel plate 38 I have provided means for husking the ear of corn as it continues its movement rearward after leaving the slat 52. These means consist of conveyers having followers thereon, which are placed at either side of the channel $c$ whereby pockets are formed, which convey the ear rearwardly past husking pins. These conveyers consist of a main drive shaft 61, and stub shafts 62 and 63. Sprockets 64 are mounted on the shafts 61, 62, and 63 in alinement and carry conveying chains 65 upon which are mounted followers or pushers 66. Sprockets 64 are preferably placed in pairs on each shaft, so that double chains 65 may be used while the followers 66 may be formed from plates, which are suitably secured to chains 65 as by means of a flange 67. The followers 66 upon the chains 65 are so spaced and the chains are of such length that as the followers come together above the portion *c* after leaving the portion *b*, they will be arranged so that the followers of the chain on one side alternate with the followers on the other side whereby substantial square pockets may be formed to receive the ears and hold them upright.
I have provided the following means for husking the ears as they are carried rearwardly by the followers 66: Adjacent to the edges of the portion *c* a narrow vertical flange 68 extends at either side of the portion *c* for a short distance. Beneath the chains 65 bearings 69 are secured to the plate 40 at intervals and in position spaced from the flange 68. These bearings have their axes arranged at obtuse angles to the line of travel of the ears of corn through the portion *c*. Bearing openings are also provided at 70 in the flanges 68 and through each bearing 69 and corresponding opening 70 a pointed pin 71 is slidably received. A collar 72 is secured to each pin 71 adjacent to the flange 68 and a spring 73 surrounds the adjacent portion of the pin 71. The collars 72 effect two purposes in that they coact with the spring 73 in connection with the bearings 69 yieldingly to hold the point of the husking pins 71 in the path of travel of the ears of corn and they also act as stops when they coact with the flanges 68 to prevent the pins 71 from extending past the center of the portion *c*. The part of the plate 40 inside the flange 68 and adjacent to each of the pins 71 is punched upwardly as shown at 74 to form shields whereby the husks, which are torn loose from the ear by the pins 71 may be diverted down below the surface of the plate 40.

The operation of the parts just described is as follows: It may be assumed that the shafts 61 are suitably connected with the rear traction wheels of the machine, so that the inner side of the chains 65 will travel rearwardly at substantially the same rate that the machine is traveling forward. It has heretofore been described how the ears are conveyed into the channel *b* and are pulled rearwardly from the slats 52 by the forward motion of the machine, which causes the still rooted stalks of corn to pull the ears, which are still attached thereto rearwardly along the channel *b*. When these reach position adjacent to the followers 66 they will lie between two of the adjacent followers 66 in a somewhat inclined position. As their rearward progress continues they will reach the intersection of channels at either side of the rear end of the plate 41 and there be further straightened by the fact that the followers from the conveyer on the other side run into the path of travel of the followers of the side from which they come whereby a substantially square pocket is formed to support the ears.

As the ears move farther rearward they come in contact with the points of the husking pins 71 and their further rearward progress tends to force the points back out of their way. As the pins 71 are held in place by the springs 73, this may be accomplished but some of the pins will have pierced the husks of the ears, so that as the points slide around the kernels, during their further rearward progress, the husks will be turned down away from the kernels and turned under the portions 74 and thereby underneath the plate 40. In order to insure that all of the husks will be torn off, by this process, I provide a plurality of husking pins 71 at either side of the channel *c*. As a further precaution I also provide a similar pin which is mounted on the support, which extends above the followers 66 whereby the husks at the top of the ear may be loosened before the husking pins 71 commence to act on such husks.

This supplementary husking pin is mounted on the upright 75 which has a stirrup 76 formed at its upper end. The ends of the stirrup 76 have bearings therein through which a pin 77 is slidably received. A spring 78 has its forward end passed through the pins 77 or secured thereto in any suitable manner and a stop or collar 79 is secured to the rear end of the pin 77. This construction is substantially similar to the construction of the other husking pins 71 and is designed to be placed in such position that the points of the pins 77 will project into the path of travel of the upper ends of the ears before they reach the pins 71 whereby the husks at the top of the pins may be loosened before the pins 71 start to act upon the ears.

As the ears leave the followers 66 the further forward movement of the machine causes the stalk to pull them to position below the rear axle 14. The axle 14 has a three bladed knocker 80 secured thereto in position above the end of the portion *c* so that when the ear is hit by the blades 81 of the knocker 80, the blades are so shaped that they will both break the stem of the ear thereby separating it from the stalk and will also throw the ear toward the center of the machine.

A pan 82 is suspended from the axle 14 by supports 83. Mounted within the bottom of the pan 82 is a bracket 84, which supports an elevator conveyer 85, which has followers or pushers 86 secured to the slats thereof. The elevator conveyer extends upwardly through the casing 87 to position above the wagon box. A sprocket 88 is secured to the rear axle 14 and carries a chain 89, which extends around a sprocket secured to the upper elevator shaft whereby the elevator may be operated to convey materials received by the pan 82 to the wagon box 12.

The operation of the parts just described is as follows: After the ears of corn have been husked by the husking pins 71 they are pulled to the rear of the channel $c$ by the coaction of the roots of the plants or stalk with the forward movement of the machine where the blades 82 hit the ear thereby detaching it from the stalk by breaking the stem. The ear then falls toward the plate 40 and along the inclined plates 90 in the bottom of the pan 82, then slides onto the followers 86 of the conveyer 85 and are therefrom carried up into the wagon box.

I shall now proceed to describe the means for connecting the conveyers 50 and 65 with the rear axle whereby these conveyers may be operated in the proper direction at the proper speed. Secured to the axle 14 adjacent to one of the traction wheels is a beveled gear 91, which meshes with a second beveled gear 92, which in turn is secured to the end of a shaft 93. The shaft 93 is journaled in brackets 94 and 95. The bracket 94 is secured to the upright 36 while the bracket 95 is secured to a support between longitudinal frame members 96 and 97. The shaft 93 extends up through the bracket 95 and has at its upper end two spaced beveled gears 98 and 99. Adjacent to the frame members 13 a stub shaft 100 extends upwardly from the bracket 95 and carries spaced beveled gears 101 and 102, which are alined respectively with gears 99 and 98. A bracket 103 similar in mounting to the bracket 95 extends between longitudinal frame members 104 and 105 on the opposite sides of the machine and carry stub shafts 106 and 107. These latter shafts have at their upper ends beveled gears 108 and 109, which are alined with each other and with the beveled gears 99 and 101. Beveled gears 110 and 111 are also secured to the shafts 106 and 107 in position spaced from the gears 108 and 109 and in alinement with the gears 98 and 102. Brackets 112 and longitudinal frame members 11 have a transverse shaft 113 journaled therein upon which are mounted beveled gears 114, 115, 116, and 117, which mesh respectively with beveled gears 99, 101, 108, and 109.

Assuming that the beveled gears just mentioned are all of the same size, it will be seen that if the beveled gears 98, 102, 110 and 111 are also of similar size they will rotate at the same speed and the shafts 93, 100, 106, and 107 all rotate at the same speed. Four horizontal forwardly extending parallel shafts 118 are journaled in brackets 119 near their rear ends and in similar brackets 120 at their forward ends. The brackets 119 are secured to the frame members 11 and the brackets 120 are secured to the frame members 37. Each shaft 118 carries a beveled pinion 121, which meshes with one of the pinions 98, 102, 110 or 111 whereby all four shafts 118 rotate at the same speed. It will be remembered that the husking and picking mechanism frames are arranged so that they may be swung outwardly at their forward ends near the rows of corn of varying widths so that I have provided universal joints 122 in each of the shafts 118 so that their forward ends may be swung somewhat out of alinement without affecting the power, which may be secured thereby to any extent. As has been noted in the description the forward brackets 120, which carry the shafts 118 are secured to the husking and picking frame member 37, so that the forward ends of these shafts will move with these latter frames.

In the practical operation of my improved husking and picking machine the machine as described is provided with any suitable draft means as horses or tractors and then pulled along the rows of corn in a field with the channels $a$ of the plates 38 alined with the rows of corn so that the forward movement of the machine causes the stalks of corn to pass rearwardly along these channels $a$. If there be more than one stalk in a hill, it has already been described how the stalks are separated and one will pass along one side of the channel $b$ while the other will pass along the other side of the channel $b$. When the stalks reach position between the slats 47 and 52 they are thrust therebetween by the conveyers 50 while the ears are unable to pass between these slats on account of their size and remain hanging through the slats. Further forward movement of the machine causes the ears to slide down the inner surfaces of these slats 47 and 52 to position adjacent to the divider plate 41. Where the further forward movement of the machine causes the ears to slide along the rear portion of the channels $b$ from there they pass along the channel section $c$ where they are husked and the husks turned along the plate 40 by means of the husking pins 71 and the raised guard portions 74. After being husked they reach position beneath the blades 82 where they are knocked loose from their stems and the stalk and fall into the pan 82 from which they are conveyed by the elevator 85 to the wagon box 12.

It will be noted that each of the shafts 118 has secured thereto spaced doubled pinions 123 and 124, which are adapted to coact with correspondingly beveled pinions 125 and 126, which are secured to the upper ends of shafts 61 and 45 respectively. It will be remembered that the latter shafts connect with and drive chains 65 and 50 respectively whereby the rear axle 14 is operatively connected with each of the conveyers in the machine, so that each part performs its function in harmony with the remaining parts of the machine.

From the foregoing it will be seen that I have provided an automatic machine adapted to both pick and husk ears of corn under the conditions ordinarily found in a corn field and which performs the necessary processes up to placing of the husked ears in a wagon box from which they may be moved in any desired manner to a storage bin.

I claim as my invention:

1. In a corn husking and picking machine, a wheel supported frame, a pair of spaced parallel slats mounted on said frame, said slats being spaced a distance apart greater than the average diameter of a cornstalk and less than the average diameter of the thickest part of an ear of corn, means whereby when the machine is advanced a rooted cornstalk is drawn between the slats, so that the forward motion of the frame will cause the still rooted stalk to slide the ears along the slats to one end thereof, a guideway at said end of the slats of substantially the width of the distance between the slats and extended rearwardly of the frame therefrom in such position that the ears sliding from the ends of the slats will be received by the guideway and pulled therealong by the stalk during further forward movement of the frame, means for husking the ears during their rearward movement, and means for detaching said ears from the stalk.

2. In a corn husking and picking machine, a wheel mounted frame, a pair of spaced parallel slats mounted on said frame, said slats being spaced a distance apart greater than the average diameter of a cornstalk and less than the average diameter of the thickest part of an ear of corn, means whereby when the machine is advanced a rooted cornstalk may be forced between the slats whereby the ears of the stalk will remain on the opposite side of the slats from the stalk so that the forward motion of the frame will cause the still rooted stalk to slide the ears along the slats to one end thereof, a guideway at said end of the slats of substantially the width of the distance between the slats and extended rearwardly of the frame therefrom in such position that the ears sliding from the ends of the slats will be received by the guideway and pulled therealong by the stalk during further forward movement of the frame, a plurality of husking pins of the frame mounted on the frame adjacent to said guideway, means for yieldingly holding the points of said pins into the path of movement of said ears along the guideway whereby said movement of the ears will cause said pins to engage the husks on the ears and tear the husks away from the ears.

3. In a corn husking and picking machine, a wheel mounted frame; a pair of spaced parallel slats mounted on said frame, said slats being spaced a distance apart greater than the average diameter of a cornstalk and less than the average diameter of the thickest part of an ear of corn, means whereby when the machine is advanced a rooted cornstalk may be drawn through between the slats whereby the ears of the stalk will remain on the opposite side of the slats from the stalk so that the forward motion of the frame will cause the still rooted stalk to slide the ears along the slats to one end thereof, a guideway at said end of the slats of substantially the width of the distance between the slats and extended rearwardly of the frame therefrom in such position that the ears sliding from the ends of the slats will be received by the guideway and pulled therealong by the stalk during further forward movement of the frame, a horizontal shaft disposed above and transversely relative to said guideway, a plurality of arms secured to and extended from said shaft adjacent to said guideway, and means for rotating said shaft whereby rotation of said arms will cause them to engage the rearwardly moving ears in the guideway to detach said ears from the stalk.

4. In a corn husking and picking machine, a wheel mounted frame, a pair of spaced parallel slats mounted on said frame, said slats being spaced a distance apart greater than the average diameter of a cornstalk and less than the average diameter of the thickest part of an ear of corn, means whereby when the machine is advanced the rooted cornstalk may be drawn through between the slats whereby the ears of the stalk will remain on the opposite side of the slats from the stalk so that the forward motion of the frame will cause the still rooted stalk to slide the ears along the slats to one end thereof, a guideway at said end of the slats of substantially the width of the distance between the slats and extended rearwardly of the frame therefrom in such position that the ears sliding from the ends of the slats will be received by the guideway and pulled therealong by the stalk during further forward movement of the frame, means for causing the ears to move rearwardly along said guideway independent of the pull of the stalk to which they are attached, means for husking the ears during their rearward movement, and means for detaching said ears from the stalks.

5. In a corn husking and picking machine, a wheel supported frame, a member having a longitudinal slot therein, and means whereby when the machine is advanced along a row of corn the rooted stalks will be manipulated so that the stalks will be on one side of said member and the ears on the other side thereof, and means for removing the ears from the stalks after the ears and stalks have been manipulated as described.

6. In a corn husking and picking machine, a wheel supported frame, a member having a longitudinal slot therein, means whereby when the machine is advanced along a row of corn the rooted stalks will be manipulated so that the stalks will be on one side of said member and the ears on the other side thereof, means for conveying ears along said member, yieldingly mounted pins arranged to project into the path of said ears for stripping the husks from the ears, and means for separating the ears from the stalks.

7. In a corn husking and picking machine, a wheel supported frame, a member having a longitudinal slot therein, means whereby when the machine is advanced along a row of corn the rooted stalks will be manipulated so that the stalks will be on one side of said member and the ears on the other side thereof, means for conveying ears along said member, yieldingly mounted pins arranged to diagonally project into the path of said ears for stripping the husks from the ears.

8. In a corn husking and picking machine, a wheel supported frame, a member having a longitudinal slot therein, means whereby when the machine is advanced along a row of corn the rooted stalks will be manipulated so that the stalks will be on one side of said member and the ears on the other side thereof, means for conveying ears along said member, yieldingly mounted pins arranged to project into the path of said ears for stripping the husks from the ears, a knocker device and means for intermittently moving said knocker device across the path of said ears to strike the ears and knock them laterally for separating them from the stalks.

Des Moines, Iowa, September 20, 1917.

MARTEMUS van OMME.

Copies of this patent may be obtained for five cents each, by addressing the "Commissioner of Patents Washington, D. C."